US006410071B1

(12) United States Patent
Polster

(10) Patent No.: US 6,410,071 B1
(45) Date of Patent: Jun. 25, 2002

(54) METHOD AND CONTROL SYSTEM FOR CONTROLLING PASTEURIZATION

(76) Inventor: Louis S. Polster, 2205 Marthas Rd., Alexandria, VA (US) 22307

( * ) Notice: Subject to any disclaimer, the term of this patent is extended or adjusted under 35 U.S.C. 154(b) by 22 days.

(21) Appl. No.: 09/613,510

(22) Filed: Jul. 10, 2000

(51) Int. Cl.$^7$ .................................................. A23L 3/00
(52) U.S. Cl. ...................................... 426/521; 426/665
(58) Field of Search ................................ 426/509, 520, 426/521, 524, 665

(56) References Cited

U.S. PATENT DOCUMENTS

| | | |
|---|---|---|
| 212,007 A | 2/1879 | Inglis et al. |
| 709,583 A | 9/1902 | Schoning |
| 1,092,897 A | 4/1914 | Clairemont |
| 1,163,873 A | 12/1915 | Thornburgh |
| 1,197,707 A | 8/1916 | Bennett |
| 1,261,724 A | 4/1918 | Duke |
| 1,388,024 A | 8/1921 | Clairemont et al. |
| 1,520,424 A | 12/1924 | McCulluogh |
| 1,888,415 A | 11/1932 | Swenson |
| 1,922,143 A | 8/1933 | Sharp |
| 1,943,468 A | 1/1934 | Bridgeman et al. |
| 2,001,628 A | 5/1935 | Nierinck |
| 2,184,063 A | 12/1939 | Meyer et al. |
| 2,222,000 A | 11/1940 | Schmidt |
| 2,236,773 A | 4/1941 | Fischer |
| 2,337,666 A | 12/1943 | Koonz et al. |
| 2,423,233 A | 7/1947 | Funk |
| 2,438,168 A | 3/1948 | Hearst et al. |
| 2,439,808 A | 3/1948 | Hodson |
| 2,497,817 A | 2/1950 | Hale et al. |
| 2,500,396 A | 3/1950 | Barker |
| 2,565,311 A | 8/1951 | Koonz et al. |
| 2,673,160 A | 3/1954 | Feeney et al. |
| 2,713,002 A | 7/1955 | Williams |
| 2,758,935 A | 8/1956 | Shaffer |
| 2,776,214 A | 1/1957 | Lloyd et al. |
| 3,027,734 A | 4/1962 | Mills |
| 3,028,245 A | 4/1962 | Mink et al. |
| 3,046,143 A | 7/1962 | Lowe et al. |
| 3,082,097 A | 3/1963 | Haller |
| 3,113,872 A | 12/1963 | Jones et al. |
| 3,144,342 A | 8/1964 | Collier et al. |
| 3,148,649 A | 9/1964 | Moore et al. |
| 3,262,787 A | 7/1966 | Elles |
| 3,321,316 A | 5/1967 | De Paolis et al. |
| 3,364,037 A | 1/1968 | Mink et al. |
| 3,420,790 A | 1/1969 | Gassner et al. |

(List continued on next page.)

FOREIGN PATENT DOCUMENTS

| | | |
|---|---|---|
| CA | 668554 | 8/1963 |
| FR | 2680951 A1 | 3/1993 |
| GB | 242780 | 11/1925 |
| JP | 02 211825 A | 8/1990 |
| JP | 09 313102 A | 12/1997 |
| NL | 72 454 C | 8/1950 |
| SU | 1 634 222 A | 3/1991 |
| WO | WO 92/21254 | 12/1992 |
| WO | WO 95/12320 | 5/1995 |
| WO | WO 95/14388 | 6/1995 |
| WO | WO 95/18538 | 7/1995 |
| WO | WO 97/07691 | 3/1997 |
| WO | WO 99/33362 | 7/1999 |

OTHER PUBLICATIONS

The Temperature Measurement Handbook Encyclopedia, Omega Energy, 1992, cover & pp. 9–12, 27–30; F4; Z–81; 2–120 and copyright page.
Groen, Model N Steam Jacket, p 51AF, Rev. 1/89, 1 pg. brochure.
E.M. Funk, "Pasteurization of Shell Eggs," University of Missouri, College of Agriculture, Agricultural Experiment Station, Research Bulletin 364, pp. 1–28 (May 1943).
Oliver Products Company, "The Oliver® Aqua–Therm™ Water Convection Oven System," Brochure No. 11134–1–5/93.
M.E. St. Louis, "The Emergence of Grade A Eggs as a Major Source of *Salmonella Enteritidis* Infections," JAMA, vol. 259, No. 14, pp. 2103–2107 (Apr. 8, 1998).
Food Industry, vol. 341, Mar. 1948, p. 71.
REVCO–Lindberg Multipurpose Water Baths letter, plus brochure (Letter plus 3 page brochure).
E. M. Funk, "Maintenance of Quality in Shell Eggs by Thermostabilization," University of Missouri, College of Agriculture, Agricultural Experiment Station, Research Bulletin 467, pp. 1–46 (Dec. 1950).
HyCal Sensing Products May 1997, Temperature and Moisture Sensors, cover plus pp. i, ii and iii.
E. M. Funk, "Stabilizing Quality in Shell Eggs," University of Missouri, College of Agriculture, Agricultural Experiment Station, Research Bulletin 362, pp. 1–38 (Apr. 1943).
Honeywell Micro Switch Sensing & Control, pp. 1–6, Rev. 4/97.
Water Convection Oven Brochure, Oliver Products Co., 5/93.
R. A. Lawrie, "Meat Science," 2d Ed., Pergamon Press, New York Sep. 1974, pp. 224, 225.
Albert Levie, "The Meat Handbook," AVBI Publishing Co., Westport, CT, 1963, pp. 44–45.

*Primary Examiner*—George C. Yeung

(57) ABSTRACT

In a method and control system for controlling pasteurization of a food product, the internal temperature of the product, at least one pasteurization property change rate of the product based on the internal temperature of the product, and a cumulative pasteurization property change as a function of the pasteurization property change rate and time are at least periodically determined. A value of the cumulative pasteurization property change is at least periodically compared to at least one predetermined value, and a signal is generated when a predetermined relationship arises between the cumulative pasteurization property change value and the predetermined value(s). A cooked food product is preferably pasteurized at a temperature below the temperature at which it was cooked.

2 Claims, 8 Drawing Sheets

U.S. PATENT DOCUMENTS

| | | |
|---|---|---|
| 3,445,240 A | 5/1969 | Bedrosian et al. |
| 3,461,680 A | 8/1969 | Rische |
| 3,522,061 A | 7/1970 | Whiteford |
| 3,552,297 A | 1/1971 | Williams |
| 3,658,558 A | 4/1972 | Rogers et al. |
| 3,663,233 A | 5/1972 | Keszler |
| 3,831,389 A | 8/1974 | Lipona |
| 3,843,813 A | 10/1974 | Driggs |
| 3,865,965 A | 2/1975 | Davis et al. |
| 3,882,686 A | 5/1975 | Rose |
| 3,949,114 A | 4/1976 | Viola |
| 3,961,086 A | 6/1976 | Turbak |
| 3,961,090 A | 6/1976 | Weiner et al. |
| 3,966,980 A | 6/1976 | McGuckian |
| 3,983,258 A | 9/1976 | Weaver |
| 3,988,499 A | 10/1976 | Reynolds |
| 4,045,579 A | 8/1977 | Rogers |
| 4,132,048 A | 1/1979 | Day |
| 4,136,205 A | 1/1979 | Quattlebaum |
| 4,157,650 A | 6/1979 | Guibert |
| 4,233,323 A | 11/1980 | Sway et al. |
| 4,302,142 A | 11/1981 | Kuhl et al. |
| 4,346,650 A | 8/1982 | Zaitsu |
| 4,362,094 A | 12/1982 | Polster |
| 4,457,221 A | 7/1984 | Geren |
| 4,503,320 A | 3/1985 | Polster |
| 4,511,589 A | 4/1985 | Padly et al. |
| 4,524,082 A | 6/1985 | Liot |
| 4,524,083 A | 6/1985 | Liot |
| 4,534,282 A | 8/1985 | Marinoza |
| 4,534,984 A | 8/1985 | Kuehne |
| 4,537,208 A | 8/1985 | Kuhl |
| 4,547,383 A | * 10/1985 | Goldhahn .................. 426/521 |
| 4,666,722 A | 5/1987 | Creed et al. |
| 4,702,777 A | 10/1987 | Kuhl |
| 4,808,425 A | 2/1989 | Swartzel et al. |
| 4,983,411 A | 1/1991 | Tanaka et al. |
| 4,999,471 A | 3/1991 | Guarneri et al. |
| 5,105,724 A | 4/1992 | Swartzel et al. |
| 5,179,265 A | 1/1993 | Sheridan et al. |
| 5,283,072 A | 2/1994 | Cox et al. |
| 5,288,471 A | 2/1994 | Corner |
| 5,290,583 A | 3/1994 | Reznik et al. |
| 5,306,466 A | 4/1994 | Goldsmith |
| 5,393,541 A | 2/1995 | Bushnell et al. |
| 5,431,939 A | 7/1995 | Cox et al. |
| 5,445,062 A | 8/1995 | Polster |
| 5,474,794 A | 12/1995 | Anderson et al. |
| 5,494,687 A | 2/1996 | Polster |
| 5,503,064 A | 4/1996 | Scheel et al. |
| 5,549,041 A | 8/1996 | Zhang et al. |
| 5,589,211 A | 12/1996 | Cox et al. |
| 5,869,341 A | 2/1999 | Woodaman |
| 5,916,617 A | 6/1999 | Polster |
| 5,993,886 A | 11/1999 | Polster |

* cited by examiner

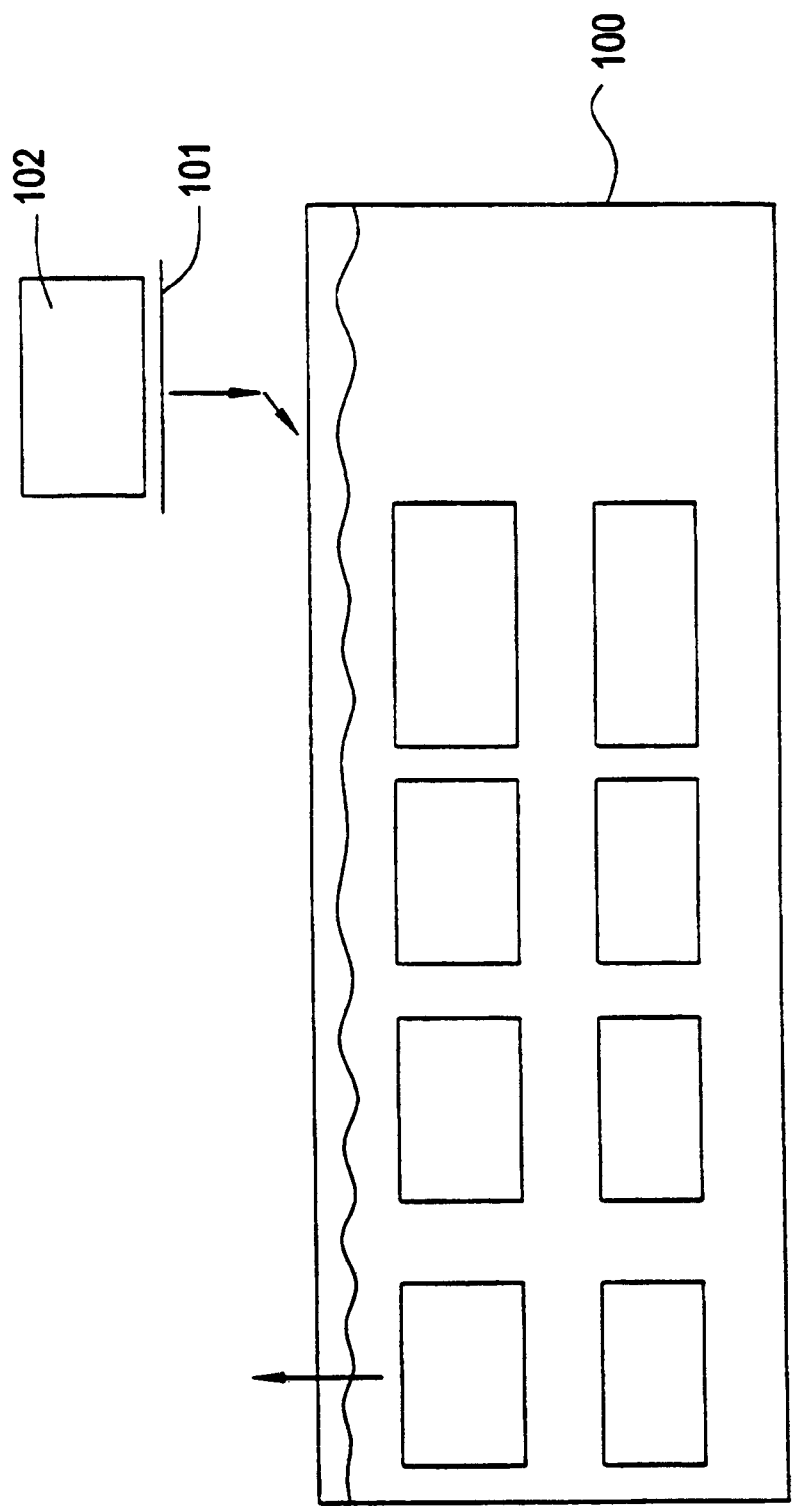

METHOD AND CONTROL SYSTEM FOR CONTROLLING PASTEURIZATION

BACKGROUND OF THE INVENTION

1. Field of Invention

The present invention relates to a method and control system for controlling pasteurization of food products.

2. Background

In food products, heating can bring both benefits and detriments to the products. For example, heating can pasteurize, tenderize and/or cook food products. Too much or too poorly controlled heating, on the other hand, can impair the functionality of and, e.g., cook or significantly alter the flavor profiles of food products that are supposed to be uncooked (i.e., that are supposed to substantially retain the useful properties of the uncooked product), or, e.g., toughen, burn, dessicate or significantly alter the flavor profiles of cooked food products.

Pasteurizing of proteinaceous food product can be carried out by heating to destroy infectious organisms such as salmonella. Pasteurization may be defined as heat treatment for the purpose of killing or inactivating disease-causing organisms. For example for milk, a minimum exposure for pasteurization is 62° C. for 30 minutes or 72° C. for 15 seconds. The latter exposure is called flash pasteurization. Complete sterilization may require ultra-high pasteurization such as treatment at 94° C. for 3 seconds to 150° C. for 1 second to kill pathogenic bacteria and inactivate enzymes that cause deterioration and to provide for satisfactory storage life.

Minimum food safety processing standards for various commodities have been promulgated and are enforced by the United States Department of Agriculture (USDA). Pasteurization may be defined in accord with the standards mandated by the USDA. The Nutrition Action Health Letter published by the Center For Science In The Public Interest (July/August 1991 Edition, Vol. 18, No. 6, "Name Your (Food) Poison") describes concern with the growing number of cases of food poisoning due to food infections.

Many known processes for pasteurizing food are insufficient to assure safety of some foods from infections or cannot be applied to some food products. The "Name Your (Food) Poison" article reports that dairy products, eggs, poultry, red meat and seafood, in that order, are the most common causes of food poisoning. Shell eggs are particularly difficult to pasteurize because of their structure. The article indicates that one of 10,000 eggs is contaminated with salmonella enteritis.

The United States Department of Agriculture (USDA) regulates minimum safety standards for pasteurizing in-shell eggs. These standards are promulgated in order to ensure that certain microorganisms, including such infectious organisms as Salmonella, are substantially destroyed prior to distribution and consumption of the eggs. The USDA defines pasteurization as a heat treatment for the purpose of killing these disease-causing organisms.

One source of infection arises when the egg shells come into contact with organic refuse. Contamination results because the egg shells have numerous pores which permit infectious microbes, which are contained in the organic refuse, to penetrate the pores of the eggs. Another source of infection results from trans-ovarian contamination. This occurs when chickens or other poultry ingest or are otherwise infected by infectious microbes and transfer the microorganisms directly into the eggs.

Techniques for improving pasteurization of eggs have been proposed. These techniques attempt to destroy infectious disease causing organisms in in-shell eggs without substantial loss of functionality. One approach to pasteurizing in-shell eggs involves heating the in-shell eggs in water baths, for various times and at various temperatures. The time/temperature ratios vary widely because different approaches involve a compromise between the degree of safety achieved and the quality or the functionality of the eggs retained after pasteurization is completed. The USDA has devised time/temperature ratios, but they are only for liquid eggs.

Cox et al. (PCT/US94/12950), which is hereby incorporated by reference, discloses a method for destroying infectious disease causing organisms in in-shell eggs without substantial loss of functionality. Cox et al. employs a temperature versus time relationship in order to accomplish pasteurization of the in-shell eggs. An initial egg temperature and processing temperature at the beginning of the pasteurizing process of a whole shell egg must be known. These temperatures are used to determine the total processing time, e.g., the total length of time over which the eggs are heated. According to a preferred embodiment of Cox et al., minimum temperatures/time requirements for liquid whole eggs are applied equivalently to in-shell eggs once the selected pasteurization temperature has been achieved at the shell egg yolk center.

Cox et al. uses the following temperature timetable for determining the pasteurization time of in-shell eggs.

| Temperature | Real Processing Time (RPT) (Minutes) |
| --- | --- |
| 130° F. | =65 |
| 131° F. | =49 |
| 132° F. | =38 |
| 133° F. | =28 |
| 134° F. | =20 |
| 135° F. | =16 |
| 136° F. | =11 |
| 137° F. | =8 |
| 138° F. | =6 |
| 139° F. | =4.75 |
| 140° F. | =3.5 |

This table describes the processing of in-shell eggs after they attain the required pasteurizing preprocessing temperature. The initial temperature is applied until the in-shell eggs reach a temperature equilibrium with the heat transfer medium. The RPT for a given pasteurization regimen can only begin after this point has been reached.

Cox et al. also discloses that factors including the size and internal initial temperature of the eggs may affect the time required for the eggs to reach the effective processing temperature. Thus, an initial temperature that causes pasteurization of one batch of eggs may result in impaired functionality of a second batch of eggs having a smaller size, depending on the variables associated with that particular batch of eggs.

Davidson International Application No. PCTI/US96/13006 (U.S. application Ser. No. 08/519,184), also discloses methods to pasteurize in-shell eggs using time/temperature relationships. In particular, Davidson discloses heating a yolk of the egg to within the range of 128° F. to 138.5° F. Once the yolk reaches this temperature range, it must be maintained at this temperature range for a certain time and within certain parameters.

FIG. 1 shows a temperature versus time curve implemented by the Davidson system. This curve is based substantially on the data of the above table. Referring to FIG. 1, the temperature of the egg yolk must be maintained between parameter line A and parameter line B in order for sufficient pasteurization to occur. According to Davidson, this will reduce the Salmonella by at least 5 logs, while at the same time retaining the functionality of the eggs. If the eggs are heated to a limit outside parameter lines A and B, however, the eggs will either lose their functionality or remain insufficiently pasteurized. Thus, according to Davidson it is imperative that the temperature of this system should stay within the predefined parameters.

Factors such as loss of water, temperature overshoot (e.g., raising the temperature too high), inefficient temperature sensors (e.g., low response time for raising the temperature to a predefined temperature range), and numerous other factors make it possible for the bath temperature to stray from preferred parameters. The size of the eggs, the number of eggs placed in the bath and the initial internal temperature of the eggs will also affect the pasteurization time and functionality of the eggs.

Whole eggs are not the only food products that are subject to bacterial or other such contamination. For example, other uncooked proteinaceous food products such as uncooked meat (e.g., beef, veal, pork, mutton, lamb or poultry), fin fish and shellfish (e.g., oysters, clams, scallops, mussels, crabs) are all too often contaminated with bacteria such as $E.\ coli$ and others. The contamination may occur in nature or during processing. An especially common source of contamination exists in processing facilities, where surfaces of large quantities of food products are exposed to cutting, penetrating and transporting equipment that may bear contaminants. Especially in ground or sliced products such as ground meat and seafood, the contamination can be spread throughout a large volume of the product.

Such contamination is not limited to uncooked products. Many food products today are partially or fully pre-cooked and then stored and/or transported under ambient, refrigerated and/or frozen conditions before or after sale. Food products are also commonly subjected to post-cooking processing; e.g., slicing (as with bologna, pepperoni, and other packaged meat or fish slices), mixing (as with "salads" such as egg salad, seafood salad, tuna salad, ham salad, and "devilled" products such as devilled ham), packaging, etc. where bacterial contamination and the like can be introduced into or onto the product.

Contamination is also not limited to proteinaceous food products. For example, non-proteinaceous food products such as fruits, fruit juices and vegetables have been found to be contaminated with bacteria including $E.\ coli$. Such other foods are also subject to natural and pre- and post-cooking processing conditions in which hazardous contamination can occur.

Efforts have been made to pasteurize cooked food products. However, such efforts have tended to focus on high temperature treatments or irradiation, which can pasteurize the surface of the product, but can cause adverse effects on the functionality of the product if an attempt were made to pasteurize the entire volume of the product. Surface pasteurization may be unacceptable with many cooked products, especially those that have been ground, sliced, mixed or otherwise had their interiors exposed to potential contamination after cooking (or before cooking where the cooking was not so thorough as to kill microorganisms in the interior of the product).

In my U.S. Pat. No. 5,916,617, the entire contents of which are hereby incorporated by reference, I describe processes for heat treatment of proteinaceous food products. Such processes involve heating the products at controlled temperatures and can, for example pasteurize the products without substantially impairing their functionality.

As discussed above with respect to egg pasteurization, many factors can cause heating temperatures to stray from preferred parameters. A result can be that, even when heat treated within or near a temperature range considered acceptable, variations can occur among products treated for the same length of time. Such variation itself, as well as properties of the product resulting from such variation, may be very harmful to food products.

Functionality is defined herein as the capability of a food product to provide the properties of the product that has not been treated by the process of the present invention. Loss of functionality is determined by observing the loss of quality of the food product. See my U.S. Pat. No. 5,916,617. For example, spoilage or cooking is a loss of functionality of meat in a process designed for aging of meat without cooking. Coagulation is a loss of functionality of shell eggs during pasteurization. Cooking, loss of taste and loss of texture are each a loss of functionality of oysters that are to be eaten uncooked. Overcooking such as burning or toughening, or even overcooking beyond the pre-pasteurization condition (e.g., from rare to medium or well done), or dessicating is a loss of functionality for cooked products.

The extent to which functional properties of a food product are affected by heating may be determined by testing the performance of the product under conditions in which the damage is readily observed. For example, functionality of eggs can be established by determining the quality of food products that depend upon the quality of coagulation of the egg. Such food products may include custards and pie fillings and loaves or croquettes, which depend upon the binding of food together that may be provided by the quality of egg coagulation. The functional properties may also include the elasticity of an egg protein film or the emulsifying ability to disperse oil in the making of mayonnaise and salad dressings. Functionality or functional properties of other food product are similarly established in terms of the capability of the food product to perform intended purposes after heat treatment including retaining a "natural" taste and texture.

SUMMARY OF THE INVENTION

The present invention comprises a method and control system for controlling pasteurization of food products, preferably in a heated fluid.

In embodiments of methods and control systems of the present invention, a value of a desired pasteurization property of the product is achieved by heat treatment. The temperature of the product is periodically or continuously determined. A rate of change of the desired pasteurization property based on the temperature of the product is also periodically or continuously determined.

A cumulative value of the pasteurization property change as a function of the rate of change and time is also periodically or continuously determined. The cumulative value is periodically or continuously compared to at least one predetermined value. A signal is generated when a predetermined relationship between the cumulative value and the predetermined value is revealed. The time at which comparing takes place may be before, at and/or after a predetermined time at which sufficient pasteurization is expected to be completed.

In embodiments, the invention also provides methods of pasteurizing cooked food products, in which cooked food is subjected to heat treatment at a temperature above a minimum pasteurization temperature, but below an acceptable cooked temperature of the product. Thus for instance, the cooked food is subjected to a temperature below but near, for instance within 5 or 10° F. below, a minimum temperature at which it was cooked, whereby pasteurization is achieved without further cooking.

The invention is particularly useful for, although not limited to, pasteurization of proteinaceous food product. While heat treatment may be effective in pasteurizing proteinaceous food product, heating at the same time may destroy some functionality or functional properties of the product. For example, it can partially cook an uncooked product or overcook a pre-cooked product. The present invention provides a process for pasteurizing proteinaceous food product that can achieve a delicate balancing of effective pasteurization without substantial destruction of functionality or functional properties.

BRIEF DESCRIPTION OF THE DRAWINGS

The invention will be described in conjunction with the following drawings in which like reference numerals designate like elements and wherein:

FIG. 3 is a cross sectional view of a single bath system;

DETAILED DESCRIPTION OF EMBODIMENTS

Figure 1:
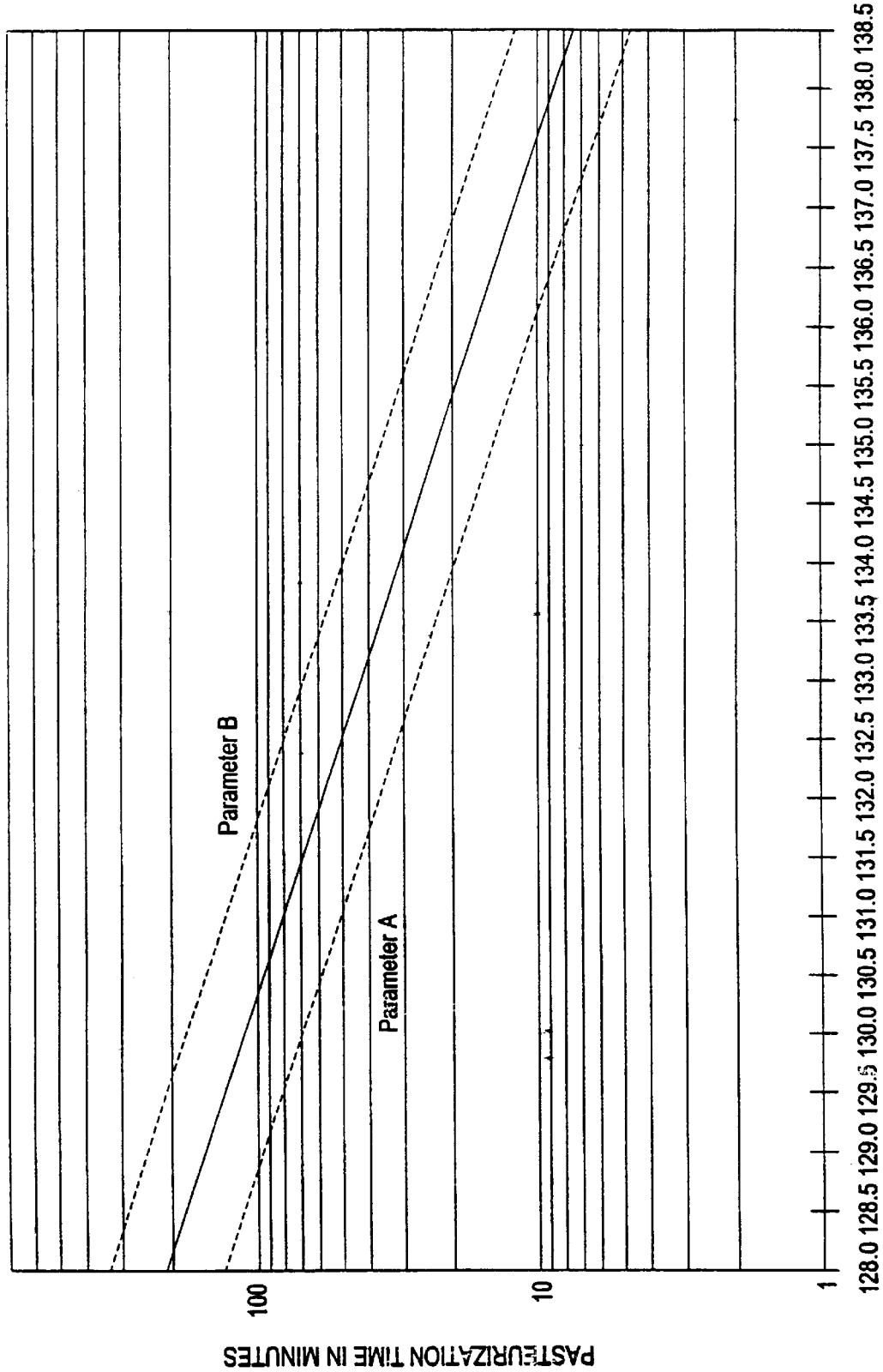
FIG. 1 shows a temperature versus time curve implemented by the Davidson system.

Methods of the present invention are preferably carried out in a heated fluid. The fluid may include a liquid or a gas, as described in my U.S. Pat. No. 6,113,961 (patent application Ser. No. 09/002,244) entitled "Apparatus And Methods For Pasteurizing In-Shell Eggs", which is incorporated herein by reference in its entirety.

The present invention can allow a pasteurization method and apparatus to achieve at least a satisfactory pasteurization property changes (e.g., reduction in bacteria count or the like) without substantially affecting the functionality of the product, despite temperature fluctuations in the fluid and thus inside the product. This may be accomplished by providing a method and control system that at least periodically determines (i) an internal temperature of the product and thus a pasteurization property change rate (e.g., log kill of Salmonella and/or other infectious microorganisms) in the product and (ii) a dwell time of the product at each such temperature so that a cumulative pasteurization property change (e.g., log kill of Salmonella and/or other infectious microorganisms) can be calculated and used to control the process.

When applied to cooked products, use of the integration aspects of the invention is desirable but not always necessary. While integration can enhance the efficiency of the process, it is only necessary that the pasteurization temperature be maintained below the minimum temperature at which the product begins to lose functionality (generally but not always a minimum temperature at which it was cooked) yet high enough to achieve pasteurization, and that the product be maintained at this temperature at least long enough to pasteurize the product to an acceptable level. The lowest possible pasteurization temperature within this window, for example within 5–10° F. of the minimum pasteurization temperature, is preferred. With, for example, primal muscle meat, heating at or below the cooking temperature may only need to be carried out long enough to pasteurize the surface. However, with ground or sliced meat or other food product that has been penetrated during processing, it is preferred to maintain the pasteurization treatment long enough to achieve the desired level of pasteurization throughout the volume of the product.

Similarly, in embodiments where there is a significant window of temperatures between the minimum pasteurization temperature and the minimum cooking or substantial functionality change temperature, such as with poultry meat, it is possible to allow substantially more temperature fluctuation within the process as long as the temperature stays within the window. Again, the lowest possible pasteurization temperature within this window, for example within 5–10° F. of the minimum pasteurization temperature, is preferred.

In preferred embodiments of the invention, the product is first enveloped by a fluid. A single, two, three or more fluid system is contemplated for use with the present invention.

Once the product is enveloped by the fluid, an internal temperature of the product may be periodically or continuously determined. Repeated experiments have shown that an internal temperature of the product may be calculated based on a variety of factors, for example (i) the time the product is enveloped by the heated fluid, (ii) the temperature of the heated fluid, (iii) the initial temperature of the product and (iv) the size of the product. The internal temperature of the product may also be determined by (i) fixing the initial temperature of the product, (ii) fixing the time the product is enveloped by the fluid and (iii) fixing the temperature of the fluid during the time the product is enveloped by the fluid.

The initial temperature of the product may be determined in various ways. From experimentation, it has been found that, for example, the initial temperature of a product may be calculated based on (i) the size of the product and (ii) the on-time of at least one heating element in the heated fluid required to return a temperature of the heated fluid after the product is enveloped by the heated fluid back to a starting temperature of the heated fluid.

That is, the initial temperature of the product may be determined by use of known values determined through experimentation. For example, through experiments, the product is temperature probed prior to enveloping the product in the heated fluid to determine the initial temperature of the product. The product is then enveloped in the heated fluid and an on-time of the at least one heating element is measured until the temperature of the heated fluid returns to a starting temperature of the heated fluid. By using this process, several on-times of the at least one heating element are determined for varying sized products and initial temperatures. These determined on-times of the at least one heating element may then be used to determine the initial temperature of the product in future processes.

By way of example, in experiments, eggs were initially probed to determine that the initial temperature of the eggs prior to being enveloped in the heated fluid was 70° F. Two hundred and seventy dozen eggs at the initial temperature of 70° F. were enveloped in a 137° F. heated fluid. The on-time of the at least one heating element was measured until the temperature of the heated fluid returned to a starting temperature of the heated fluid. In this experiment, the on-time of the at least one heating element was approximately 2 minutes and 50 seconds. By way of further example, in experiments, eggs were initially probed to determine that the initial temperature of the eggs prior to being enveloped in the heated fluid was 45° F. Two hundred and seventy dozen eggs at the initial temperature of 45° F. were enveloped in a 137° F. heated fluid. The on-time of the at least one heating element was measured until the temperature of the heated fluid returned to a starting temperature of the heated fluid. In this experiment, the on-time of the at least one heating element was approximately 4 minutes and 25 seconds. It was known during these experiments that the eggs weigh approximately 30 ounces per dozen and that the specific heat of the eggs is 0.88. By using this data, the initial temperature of the eggs for other sized eggs may then be determined by the determined on-times of the at least one heating element. Alternatively, a temperature drop of the fluid may be measured after contacting the eggs.

As another example, the initial temperature of the product may be determined by uniformly preheating the product to a predetermined initial temperature. This temperature is preferably below a temperature at which the property change begins, and more preferably is a temperature that has substantially no effect on the functionality of the product. This may be accomplished, for example, by enveloping the product in a preheating fluid for at least a minimum period of time to ensure that all of the product has a uniform initial internal temperature. In pasteurization embodiments, the preheating temperature of the fluid may be a temperature in the range of approximately 60°–100° F., and preferably 80°–100° F., and more preferably 80°–90° F. However, other temperature ranges are also contemplated for use with the invention so long as the temperature range does not affect the functionality of the product prior to pasteurization.

At least one pasteurization property change rate (e.g., log kill rate of Salmonella, *E. coli*, Listeria or other infectious microorganisms) is periodically or continuously determined from the internal temperature of the product. For example, log kill rates of Salmonella in eggs for various temperatures may be determined from FIG. 1. Similar pasteurization property change rates can be prepared by routine experimentation in other products—e.g., log kill rates of selected microorganisms in proteinaceous or non-proteinaceous food products as identified in the Background section above can be charted directly or as a function of temperature change rates, as can other pasteurization property changes desired in food products. A cumulative pasteurization property change (e.g., log kill of at least one selected microorganism) as a function of the at least one pasteurization property change rate and time is also periodically or continuously determined.

For example, the data of Table A may be used for determining the log kill rate(s) and the cumulative log kill of Salmonella in whole eggs. The internal temperature of the eggs is monitored as described above. Fluctuating temperatures of the fluid are reflected in changing internal temperatures of the eggs. The log kill rate at each temperature may be multiplied by the time the eggs are at such temperature and the products may be summed to determine a cumulative log kill of the eggs at any given time. The first two columns of Table A are derived from data disclosed in Cox et al. and Davidson, which are both incorporated herein by reference in their entirety.

TABLE A

| Temperature | Real Processing Time (RPT) (5 log reduction) | Minutes/log | Pulse Rate (×100) |
| --- | --- | --- | --- |
| 130° F. | =65 | 13 | 770 |
| 131° F. | =49 | 9.8 | 1,020 |
| 132° F. | =38 | 7.6 | 1,320 |
| 133° F. | =28 | 5.6 | 1,790 |
| 134° F. | =20 | 4 | 2,500 |
| 135° F. | =16 | 3.2 | 3,130 |
| 136° F. | =11 | 2.2 | 4,550 |
| 137° F. | =8 | 1.6 | 6,250 |
| 138° F. | =6 | 1.2 | 8,330 |

The first column of Table A shows the temperature of the heated fluid. The second column shows a time needed for a 5 log reduction of Salmonella at a given temperature level. The third column shows a required time for a one log reduction of Salmonella at that temperature level. The fourth column shows an exemplary "pulse rate" that may be used for accurately determining a reduction of Salmonella at a given temperature level. In this table, an arbitrary value of 10,000 pulses per log has been set, and the pulse rate shown is in pulses per minute.

The temperature of the fluid and thus the internal temperature of the product may fluctuate over time. This makes use of a pulse rate particularly convenient. Thus for example, due to this fluctuation, the pulse rate will also fluctuate over time. For example, while the temperature of the fluid is 130° F., the counter may, for example, count 770 pulses per minute. When the temperature of the fluid increases to 138° F., the pulse rate increases, for example, to 8,330 pulses per minute.

Because of the known relationship between the temperature of the fluid and the pulse rate, the present method can accurately calculate the cumulative pasteurization property change. For example, a pulse counter may count the pulses until the cumulative pasteurization property change reaches a predetermined value, such as 30,000 pulses for a: 3 log reduction in Salmonella, or 50,000 pulses for a 5 log reduction in Salmonella. The counter preferably starts as soon as the internal temperature of the food product, more preferably at the center of the food product, exceeds the point at which the subject bacteria begin to die. In alternative embodiments, the cumulative pasteurization property change may be calculated by integrating an area under a curve, as discussed below.

The cumulative pasteurization property change is periodically or continuously compared to at least one predetermined value. The time(s) at which comparing takes place, for example, may be before, at or after a predetermined time at which sufficient pasteurization property change is expected to be completed.

In embodiments, the comparing may take place at periodic or continuous intervals while the pulse counter is, for example, counting the pulses, as described above. For example, in embodiments, the method of the present system compares the cumulative pasteurization property change, e.g., number of counted pulses, to a predetermined value, e.g. at least 3 (or 5) log reduction in bacteria count or at least 30,000 (or 50,000) pulses, for accurately determining when the cumulative pasteurization property change (e.g., log kill) substantially indicates a desired degree of pasteurization. Alternatively, or in addition, the comparing may take place at intermediate times in the process. In this case, the comparison may, for example, be with predetermined values that reflect an expected degree of pasteurization for the time at which the comparison takes place. Such comparisons may be periodic, e.g. at an expected time of each one or fraction of one log reduction of bacteria, or even continuous.

A signal is generated when a predetermined relationship between the cumulative pasteurization property change and a predetermined value is revealed. In preferred embodiments, a signal may be generated when the cumulative pasteurization property change (e.g., log kill of bacteria) is approximately the desired degree of pasteurization. The product can then be removed from the heated fluid in response to the signal and cooled. In a preferred embodiment, the product may be enveloped by a chilling bath as disclosed in my U.S. Pat. No. 6,035,647 entitled "Method And Apparatus For Chilling In-Shell Eggs", which is incorporated herein by reference in its entirety.

Several other signals may also be generated at various times during the pasteurization process. For example, a signal may be generated when the product is sufficiently treated to be removed from the fluid and placed in a second or subsequent heated fluid. In this example, the product may be moved from one temperature zone to another temperature zone, such as in a two or three fluid system, as described below. A signal may also be generated when, for example, the temperature of the heated fluid needs to be increased and/or decreased so that a cumulative pasteurization property change within an acceptable time can be achieved. In embodiments of the present invention, a dwell time of the product in the heated fluid may be adjusted in response to a signal. For example, a rate of movement of the product through the heated fluid, including the timing of incremental movements and/or the speed of continuous movements, may be varied in response to the signal.

Another signal may be generated, for example, if the comparison reveals that the product has been substantially more or less heated than expected for a given point in the process. In such cases, the signal may indicate that the functionality of the product would have been substantially impaired or would be substantially impaired by completing the pasteurization process. In this example, the product may be removed from the heated fluid and subsequently, e.g., discarded, cooked or further processed in response to the signal.

The Control System

Figure 2:
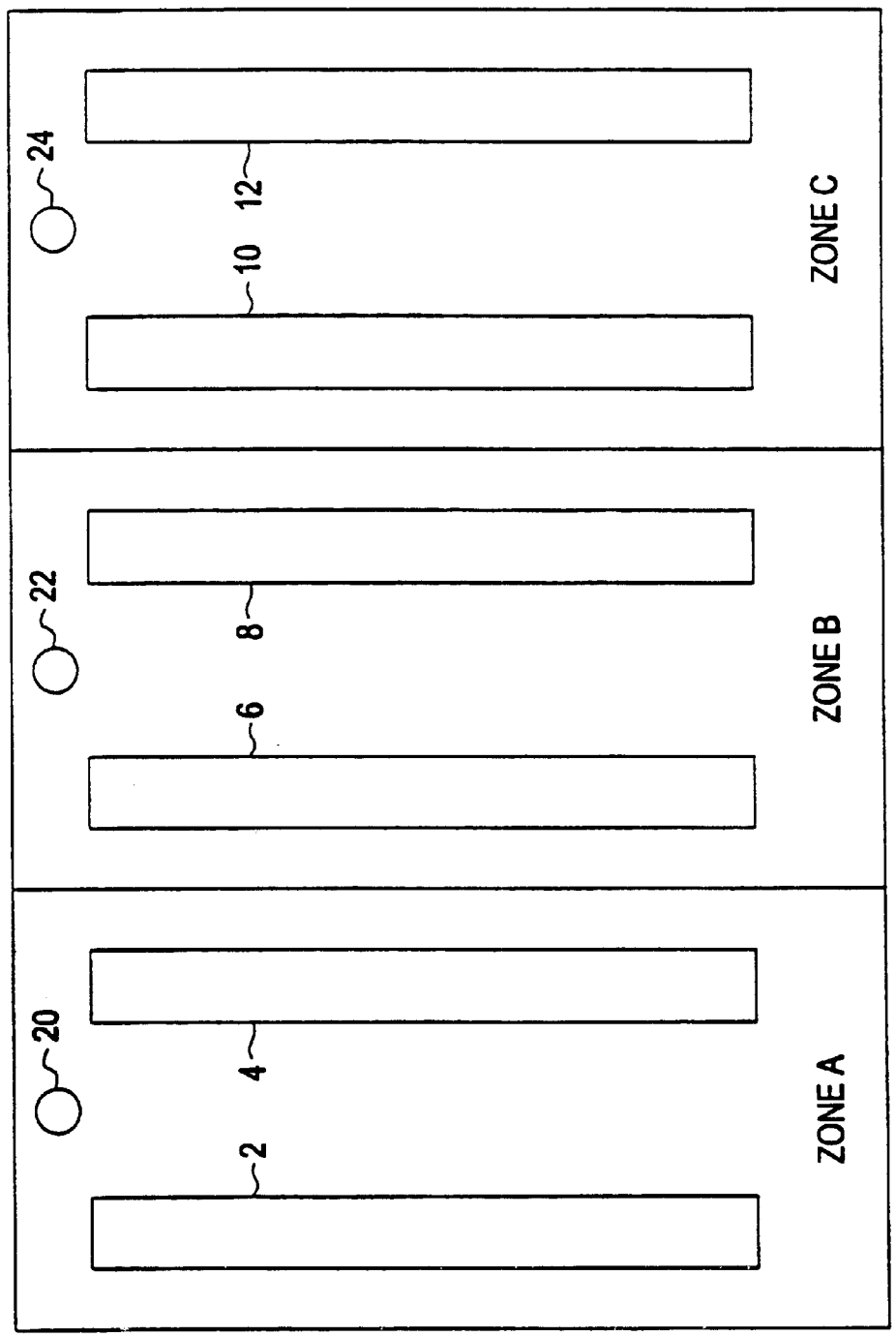
FIG. 2 is a plan view of a single bath having a plurality of heating elements and a plurality of temperature sensors.

Referring to FIG. 2, a single fluid bath having a plurality of heating elements and a plurality of temperature sensors is shown. In embodiments, heating elements 2 and 4 are located in zone A, heating elements 6 and 8 are located in zone B and heating elements 10 and 12 are located in zone C. The heating elements may be arranged in zones so that uneven loading will not, for example, cause overheating in the entire bath. Preferably, the heating elements are low watt density heating elements which supply substantially constant heat energy per unit of time to the fluid. More preferably, the temperature of the heating elements is controlled so that they do not substantially exceed the desired treatment temperature (e.g., by more than 1, 2, 3, 4, 5 or 10° F., depending on the product).

The product is preferably loaded into the bath or baths in a stack of layers of product.

Preferably, if a plurality of heaters is provided per zone, then the heaters may be substantially equally spaced apart. However, the heaters should be located to advantageously maintain the desired fluid temperature substantially uniformly throughout the bath. Exemplary heating elements and arrangements thereof are described in my above-mentioned U.S. Pat. No. 6,113,961 (application Ser. No. 09/002,244).

In embodiments, a perturbating means for vertically perturbating the fluid may also be provided. The perturbation is preferably provided in a vertical direction emanating from below and being directed upwards towards and through the at least one layer of product, preferably three or six or more layers of product, in the fluid—e.g., in the form of bubbles through a liquid bath. The perturbation of the fluid substantially eliminates temperature stratification in the fluid and provides for a more efficient heat transfer between the product and the fluid, especially within stacks of layers of the product. The perturbation may, for example, reduce the dwell time of the product prior to and during pasteurization as well as keep the fluid temperature at a substantially constant level. Perturbating apparatus and methods for stacks of eggs are described in the above-mentioned patent application Ser. No. 09/002,244, and can readily be adapted to use with other products without undue experimentation by those of skill in the art reading the present disclosure.

Figure 2A:
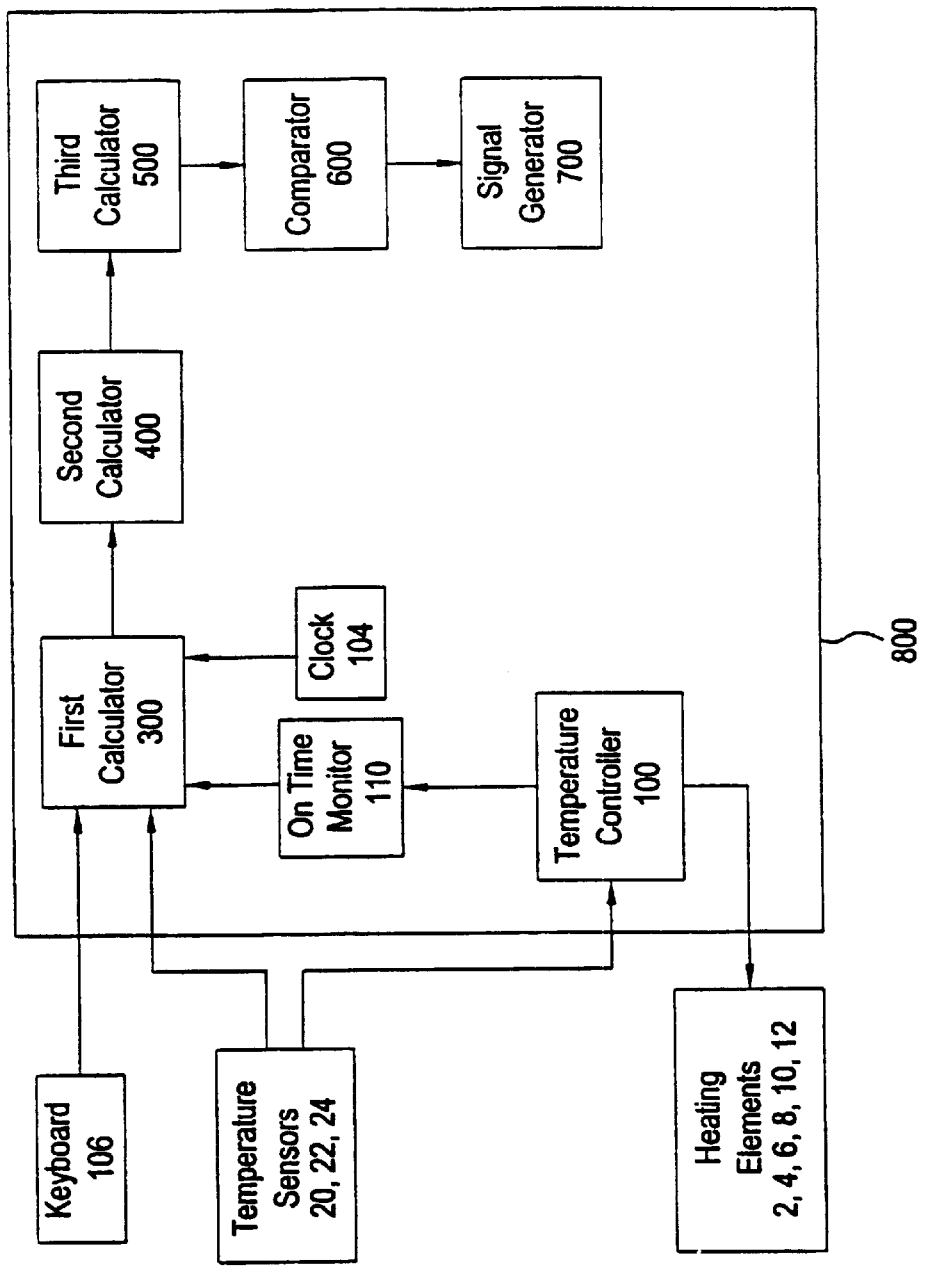
FIG. 2a shows an exemplary embodiment of a control system used by the present invention.

Referring again to FIG. 2, at least one temperature sensor (preferably two or more where redundancy is desired) is located in each zone of the fluid. For example, temperature sensor 20 is located in zone A, temperature sensor 22 is located in zone B and temperature sensor 24 is located in zone C. The location of the temperature sensors enables the sensors to quickly detect rising and falling temperatures of the fluid, thus avoiding temperature overshoot, i.e. potential overrun of the temperature in a zone. The temperature sensors also may provide the actual temperature of the fluid so as to compute the initial temperature of the product. FIG. 2a shows a block diagram of an embodiment of the present invention. A temperature controller 100 controls the heating elements for uniformly maintaining the temperature of the fluid within the desired temperature range, preferably less than or equal to about $\pm 2°$ F., preferably, $\pm 1°$ F., more preferably, $\pm 0.1°$ F. and, even more preferably, $\pm 0.03°$ F. Temperature control systems are described in the above-mentioned patent application Ser. No. 09/002,244.

To avoid temperature overshoot and other temperature variations, the temperature controller 100 may, for example, control the variations in the temperature of the fluid by turning on and turning off the heating elements 2, 4, 6, 8, 10, 12. The temperature controller 100 may turn on the heating elements when the temperature of the fluid falls below a predetermined temperature and turn off the heating elements when the temperature of the fluid substantially equals and/or exceeds the predetermined temperature. In this manner the temperature controller 100 periodically or continuously controls the temperature of the fluid. An on-time monitor 110 may also be provided to monitor the on-time of the heating elements.

A first calculator 300 periodically or continuously determines the internal temperature of the product. Preferably, the internal temperature of the product is determined by (i) the time the product is enveloped by the heated fluid, (ii) the temperature of the heated fluid, (iii) the initial temperature of the product and (iv) the size of the product. The initial temperature of the product may be determined in various manners e.g., calculated (for example by the first calculator 300) or directly input (e.g., via keyboard 106), as described above. The temperature of the fluid may be input from temperature sensors 20, 22, 24, etc. The immersion time may be input from an internal or external clock 104. The size of the product may be automatically entered (e.g., by a bar code reader and a bar code on the product container(s)) or manually entered (e.g., via keyboard 106). In embodiments, the product is weighed prior to manually entering its size.

A second calculator 400 periodically or continuously determines at least one pasteurization property change rate of the product (e.g., bacterial log kill rate) based on the internal temperature of the product. A third calculator 500 periodically determines the cumulative pasteurization property change (e.g., log kill of bacteria) as a function of the determined change rate and time. A comparator 600 periodically or continuously compares the cumulative pasteurization property change to at least one predetermined value. A signal generator 700 may generate several signals at various times during the process, as described above, in response to output of the comparator 600. In embodiments, a single programmed processor comprises the temperature controller 100, on time monitor 110, clock 104, first calculator 300, second calculator 400, third calculator 500, comparator 600, and/or signal generator 700, and thus they need not be separate devices or even separate programs.

The above description has focused on a single fluid system. However, a corresponding discussion applies to two or more fluid systems, as exemplified in more detail below.

Single Fluid Systems

Referring to FIG. 3, in embodiments a loading mechanism 101 envelops a batch of product 102 in the single liquid bath 100 and transports the product through the liquid for pasteurization of food product without substantial loss of cooked or uncooked functionality. Using the data of an empirically produced table (e.g., Table B for whole eggs), for example, the first calculator 300 periodically or continuously determines the internal temperature of the product. The second calculator 400 periodically or continuously determines at least one pasteurization property change rate (e.g., log kill rate of Salmonella) based on the internal temperature of the product. In this example, a count of 100 pulses substantially equals a single unit change of the pasteurization property (e.g., a one log reduction of Salmonella).

Referring to Table B, in one embodiment, for example, the nominal temperature of the fluid may be approximately 133.5° F. At this temperature eggs may take approximately 12 to 15 minutes to reach an internal temperature of 130° F. at which time the process of Table B begins. Temperature reductions in the fluid due to heat absorption by the eggs may affect the internal temperature of the eggs. However, the temperature drop of the fluid and the affected internal temperature of the eggs is taken into consideration when determining the cumulative log kill of Salmonella or other microorganisms.

Referring again to Table B, for example, at minute one the temperature of the fluid is 130° F., e.g., 770 pulses per minute. At minute two the temperature of the fluid is 132° F., e.g., 1,320 pulses per minute. At minute three the temperature of the fluid is 133.5° F., e.g., 2,080 pulses per minute. At minute four the temperature of the fluid is 135° F., e.g., 3,130 pulses per minute. At minute five the temperature of the fluid is 134° F., e.g., 2,500 pulses per minute. At minute six the temperature of the fluid is 133° F., e.g., 1,790 pulses per minute. At minute seven the temperature of the fluid is 132° F., e.g., 1,320 pulses per minute. At minute eight the temperature of the fluid is 133° F., e.g., 1,790 pulses per minute. At minutes nine through eleven the temperature of the fluid is 134° F., e.g., 2,500 pulses per minute. At minute twelve the temperature of the fluid is 135° F., e.g., 3,130 pulses per minute. At minutes thirteen and fourteen the temperature of the fluid is 133° F., e.g., 1,790 pulses per minute.

The third calculator 500 periodically determines the cumulative pasteurization property change (e.g., cumulative log kill of Salmonella) as a function of the pasteurization property change rate (e.g., log kill rate) and time. This is calculated by periodically counting the cumulative number of pulses over a predetermined time that the product is enveloped by the fluid. According to the above example, the eggs achieve a 3 log reduction in Salmonella after approximately 14 minutes in the fluid bath, e.g., because the pulse counter reaches approximately a count of 30,000 pulses. (The one-minute temperature sensing intervals and temperature differences are for illustrative purposes only. In practice, the intervals and differences may be smaller. Pasteurization times may also in practice differ from this example, which for clarity of illustration does not reflect the total sloping up of the internal product temperature and concomitant initial pasteurization.)

TABLE B

| Minute | Temperature | Pulse Rate |
|---|---|---|
| 1 | 130° F. | 770 |
| 2 | 132° F. | 1,320 |
| 3 | 133.5° F. | 2,083 |
| 4 | 135° F. | 3,130 |
| 5 | 134° F. | 2,500 |
| 6 | 133° F. | 1,790 |
| 7 | 132° F. | 1,320 |
| 8 | 133° F. | 1,790 |
| 9 | 134° F. | 2,500 |
| 10 | 134° F. | 2,500 |
| 11 | 134° F. | 2,500 |
| 12 | 135° F. | 3,130 |
| 13 | 133° F. | 1,790 |
| 14 | 133° F. | 1,790 |

In the example of Table B, when the eggs are enveloped by the fluid, the temperature of the fluid initially drops to 130° F. The temperature is then increased by the heating elements until the temperature of the fluid reaches 133.5° F. In this example, the heating elements are initially turned on for approximately three minutes in order for the temperature of the fluid to rise until it substantially equals the initial temperature of the fluid prior to the eggs being enveloped by the fluid. Thereafter, the temperature of the fluid is periodically or continuously controlled.

Figure 4:
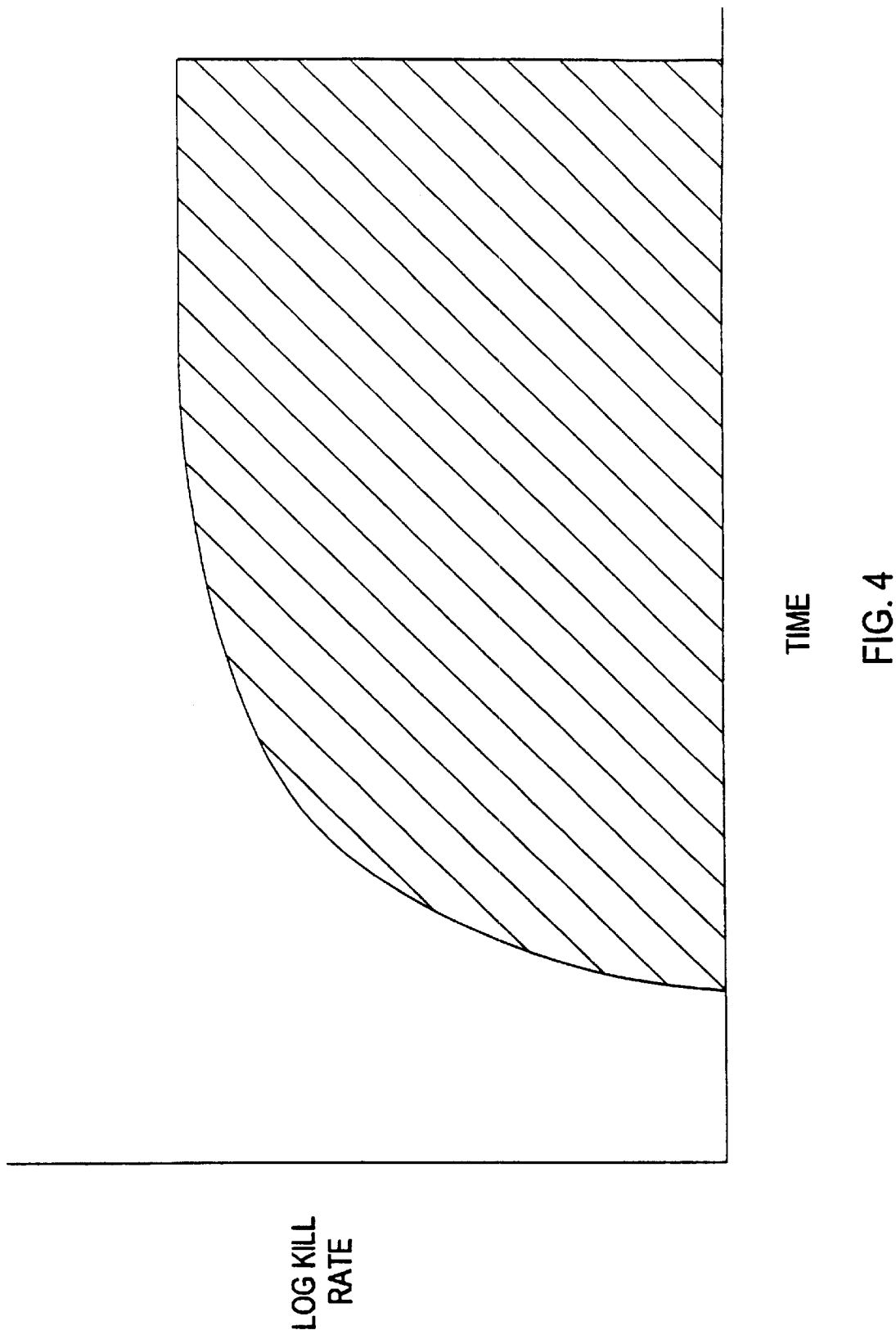
FIG. 4 shows a log kill rate of bacteria versus time curve for a single bath system.

As an illustrative example of the method of calculating the cumulative pasteurization property change (e.g., log kill), FIG. 4 shows the cumulative log kill as an area under a log kill rate versus time curve. The area under the curve is calculated by integration, e.g., counting the pulses as described above. (The area under the curve of FIG. 4 represents a 5 log reduction in Salmonella and thus does not correspond to the example of Table B.)

As seen in FIG. 4, after an initial time the pasteurization property change rate begins to slope upwards. Thereafter, the pasteurization property change rate substantially levels off. As described above, however, the internal temperature of the product may fluctuate over time, thus, for example, resulting in fluctuations of the pasteurization property change rate, as seen in FIG. 4. During this process the comparator 600 periodically or continuously compares the area under the curve, which reflects the cumulative pasteurization property change, to one or more predetermined values.

Multiple Fluid Systems

Figure 5:
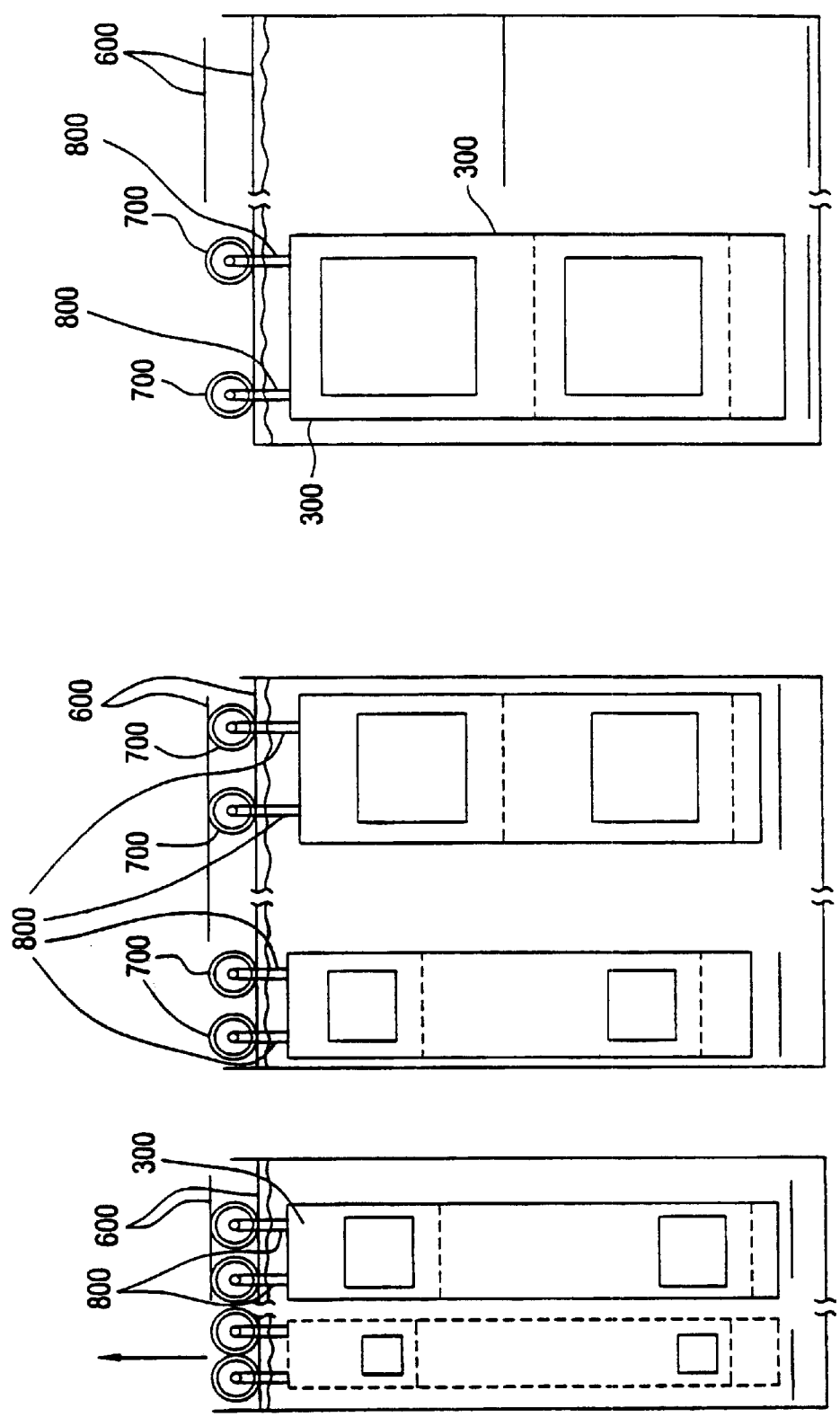
FIG. 5 is a side cross-sectional view of a multiple bath system.

Referring to FIG. 5, a plurality of liquid baths is shown. This system uses appropriate means for transporting one or more stacks of product between the various baths (and/or zones of the baths). Multiple bath systems are described in more detail in my patent application Ser. No. 09/002,244.

As an example, a carrier 300 preferably has, for example, mounts represented by the combination of wheels 700 and extensions 800, as shown in FIG. 5. The exemplary mounts permit a loader/unloader to load and unload the product in and out of the fluid as well as to transport the product laterally from one zone or bath to another, as desired.

Two Fluid System

In the two fluid system, the temperature of the first fluid is preferably higher than the temperature of the second fluid. For example, the first fluid may be heated to approximately 137.5° F. and the temperature of the second fluid heated to, for example, approximately 133.5° F. for pasteurization of a product such as eggs. This provides rapid increase of the internal product temperature to a pasteurization level and then reduction of the temperature to avoid impairing the functionality of the outer portions of the product. Other temperatures are also contemplated for use with the two fluid system.

Figure 6:
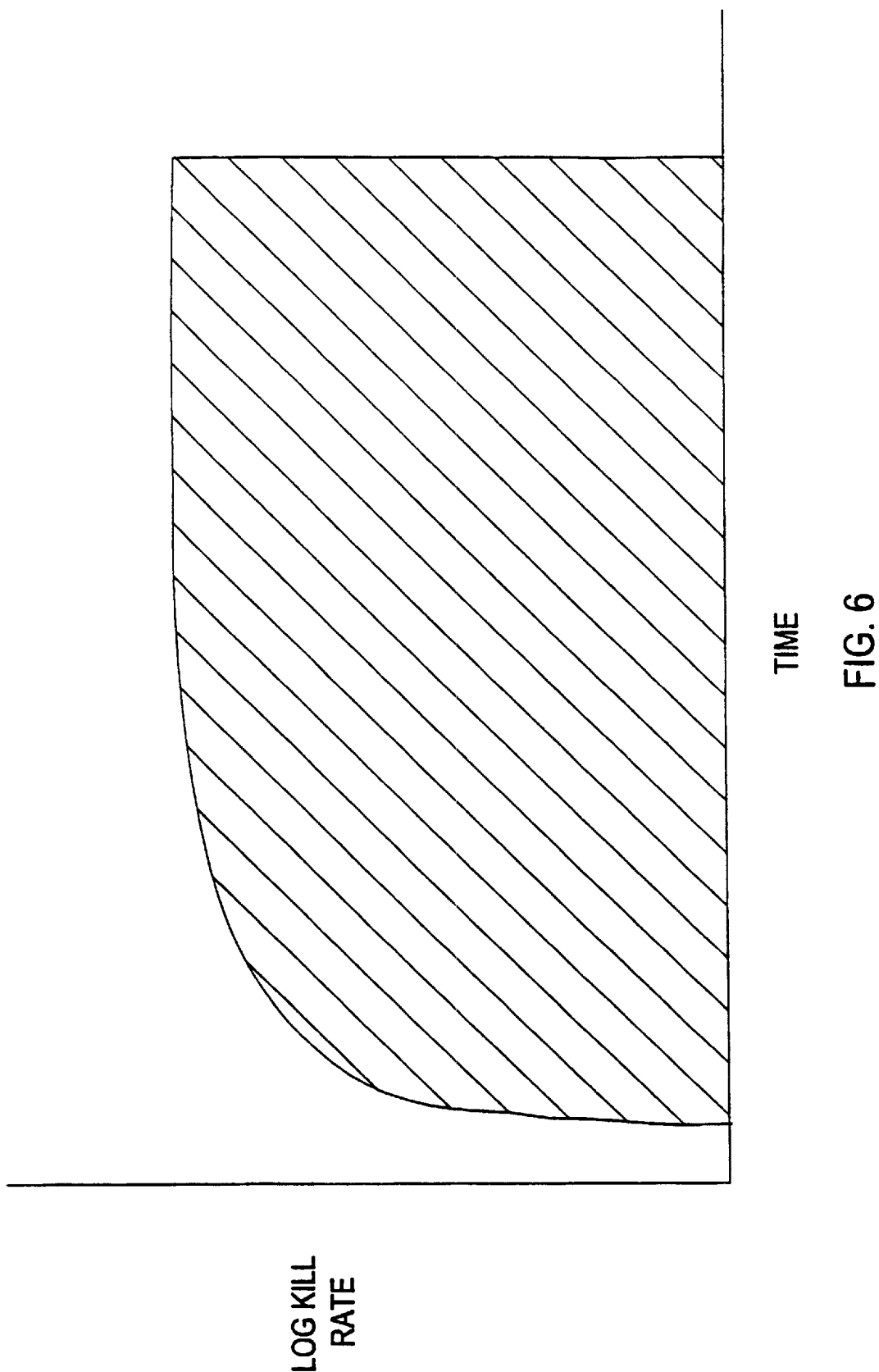
FIG. 6 shows a log kill rate of bacteria versus time curve for a two bath system.

The present system may, for example, calculate the cumulative pasteurization property change by integrating an area under a pasteurization property change rate versus time curve for the two fluid system, as shown in FIG. 6. FIG. 6 shows the point at which the product is moved from one fluid to the next. In embodiments, the overall speed that the product moves while enveloped by the fluid may be adjusted to ensure proper pasteurization.

As seen in FIG. 6, after an initial time, the pasteurization property change rate begins to slope upwards. Thereafter, the rate levels off. As described above, however, the internal temperature of the product may fluctuate over time, thus, for example, resulting in fluctuations of the rate, as seen in FIG. 6.

During this process the comparator periodically or continuously compares the area under the curve to a predetermined value. The cumulative pasteurization property change may be determined by integrating the area under the curve and comparing the area to one or more predetermined values.

The product processed in the two fluid system may achieve a desired pasteurization faster than in the one fluid system. This is because the product in the two fluid system is initially enveloped by a higher temperature fluid which provides rapid increase of the internal product temperature to a pasteurization level, thus accelerating the pasteurization property change rate. This, in turn, may enable the product to reach a cumulative pasteurization property change faster than in the one fluid system.

Three Fluid System

In the three fluid system, for example, the first fluid and the third fluid may be at higher temperatures than the second fluid. For example, they may be heated to approximately 137.5° F., while the second fluid is heated, for example, to approximately 133.5° F. for pasteurization of products such as eggs. The higher third temperature permits more rapid pasteurization toward the end of the process. Again, other temperatures are also contemplated for use with the present invention.

Figure 7:
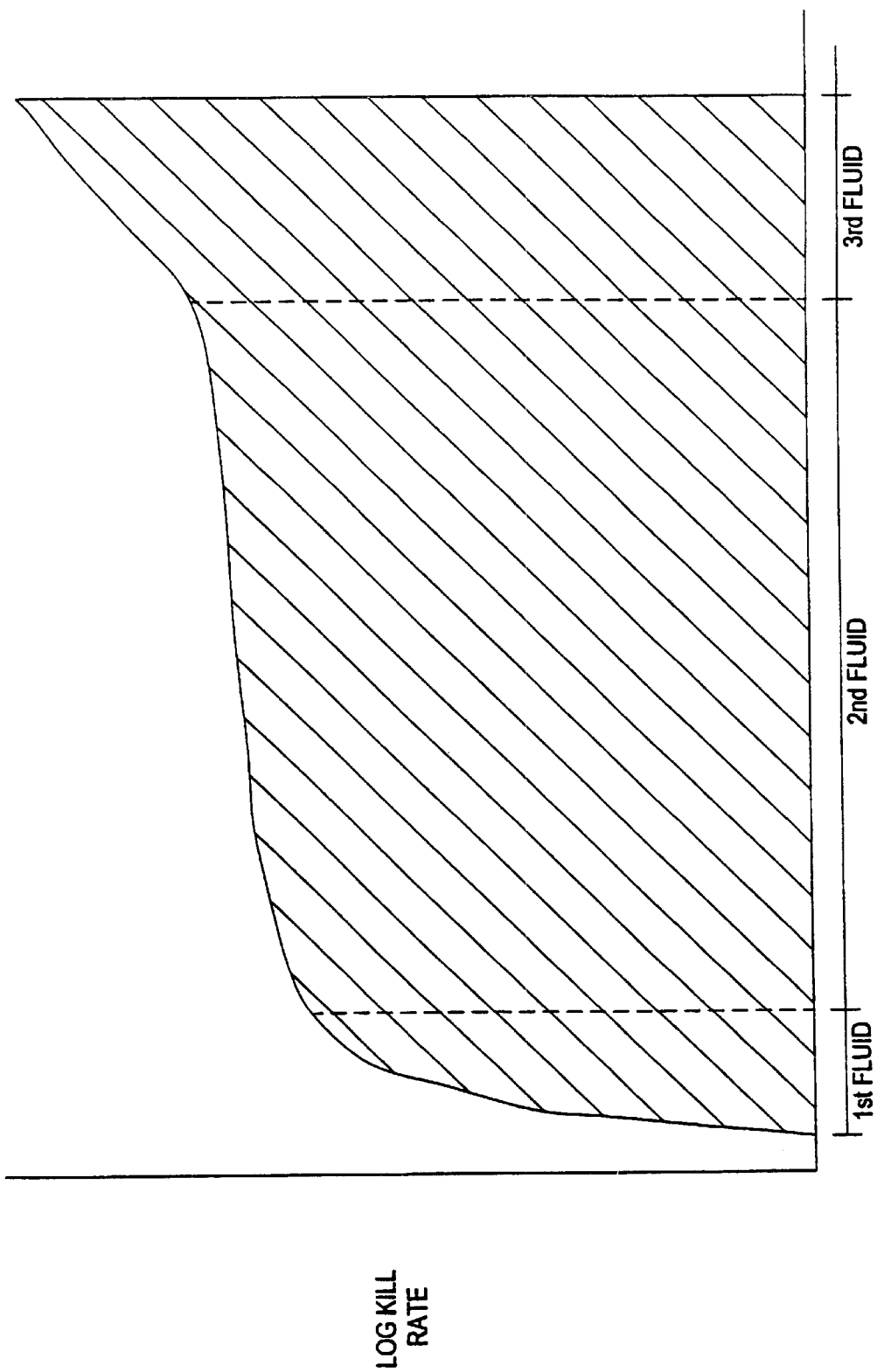
FIG. 7 shows a log kill rate of bacteria versus time curve for a three bath system.

The present system may, for example, calculate the cumulative pasteurization property change by integrating an area under a pasteurization property change rate versus time curve for the three fluid system, as shown in FIG. 7. FIG. 7 shows the point at which the product is moved from one fluid to the next. As seen in FIG. 7, after an initial time, the rate begins to slope upwards. Thereafter the rate levels off. When the product enters the third fluid, the rate again increases. As described above, however, the internal temperature of the product may fluctuate over time, thus, for example, resulting in fluctuations of the rate, as seen in FIG. 7.

The product in the three fluid system may achieve a desired pasteurization faster than in the one and two fluid systems. The higher first temperature provides rapid increase of the internal product temperature to a pasteurization level and the higher third temperature permits more rapid pasteurization toward the end of the process, thus accelerating the pasteurization property change rate. This, in turn, may enable the product to reach a cumulative pasteurization property change faster than in the one and two fluid systems.

Preferred and alternative embodiments of the control systems and methods for controlling pasteurization of products have been described in detail with particular reference to specific pasteurization processes. However, this description of specific embodiments is merely illustrative of the principles underlying the inventive concepts, which as described apply to various products and pasteurization treatments. It is contemplated that various modifications of the disclosed embodiments will, without departing from the spirit and scope of the invention, be apparent to persons of ordinary skill in the art.

What is claimed is:

1. A method of controlling pasteurization of a food product, comprising:

(a) preheating the product to a predetermined initial temperature;

(b) further heating the product by contact with a heated fluid while maintaining a temperature of the heated fluid at a substantially constant temperature while the product is in contact with the heated fluid;

(c) maintaining the product in contact with the heated fluid for a predetermined time, wherein the predetermined time is a function of a log kill rate of at least one microorganism in the product at the temperature of the heated fluid and a desired log kill level; and (d) removing the product from contact with the heated fluid at an end of the predetermined time.

2. The method of claim 1, further comprising chilling the product upon removing the product from the heated fluid.

* * * * *